United States Patent

[11] 3,602,072

[72] Inventor Duffy Sensat
 Rte 1, Box 338, Welsh, La. 70591
[21] Appl. No. 863,575
[22] Filed Oct. 3, 1969
[45] Patented Aug. 31, 1971

[54] COUPLING AND UNCOUPLING DEVICE
 8 Claims, 7 Drawing Figs.
[52] U.S. Cl. .................................................. 81/71
[51] Int. Cl. ......................................... B25b 13/48
[50] Field of Search .................................. 81/71,
 57.33; 145/53, 54; 166/117.7

[56] References Cited
UNITED STATES PATENTS
1,951,584 3/1934 Thompson .................. 81/71

| | | | |
|---|---|---|---|
| 2,947,334 | 8/1960 | Issartel ........................ | 145/54 |
| 1,445,133 | 2/1923 | Drake ......................... | 145/530 X |
| 1,415,251 | 5/1922 | McLean ...................... | 145/53 |

Primary Examiner—James L. Jones, Jr.
Attorney—LeBlanc & Shur

ABSTRACT: This disclosure relates to a device for coupling or uncoupling pipes, collars, casing and the like, including a gripping head mounted on a threaded shaft and a telescopic casing engaging the shaft, said casing normally intended to receive the shaft. As the casing telescopes an internal follower engages the shaft causing the shaft and head to rotate. A spring is also provided to return the casing to its normal extended position. During extension an internal clutch disengages the casing and shaft allowing extension of the casing without rotation of the head.

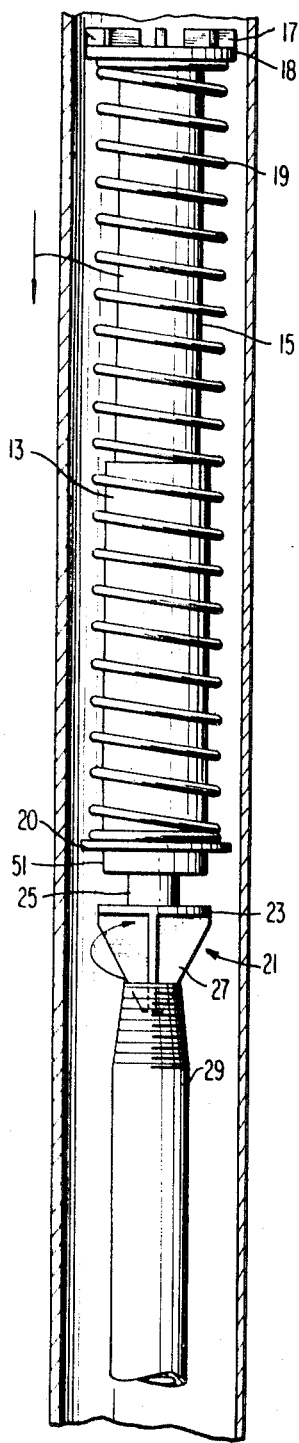
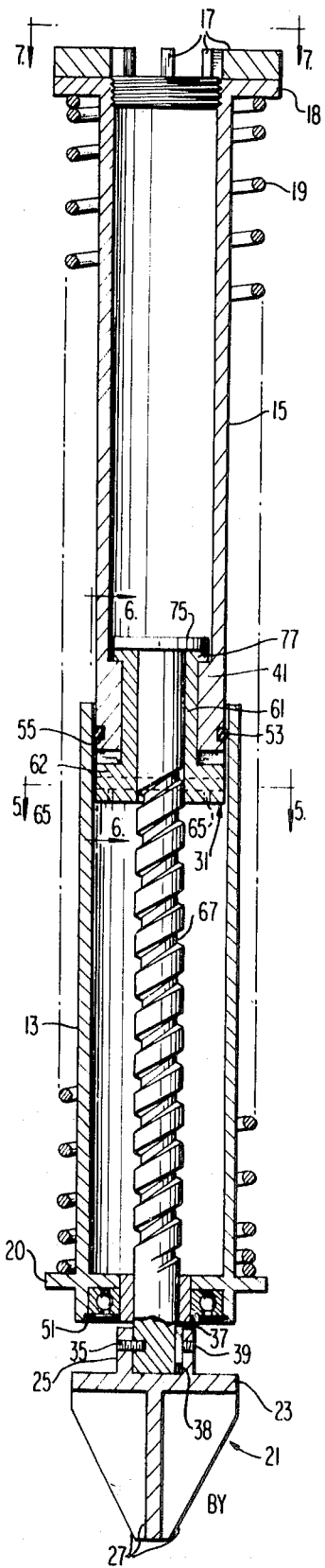
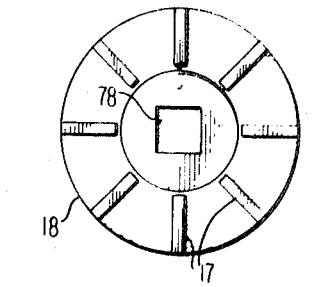
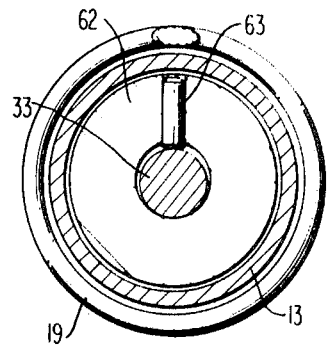
INVENTOR
DUFFY SENSAT
LeBlanc & Shur
ATTORNEYS

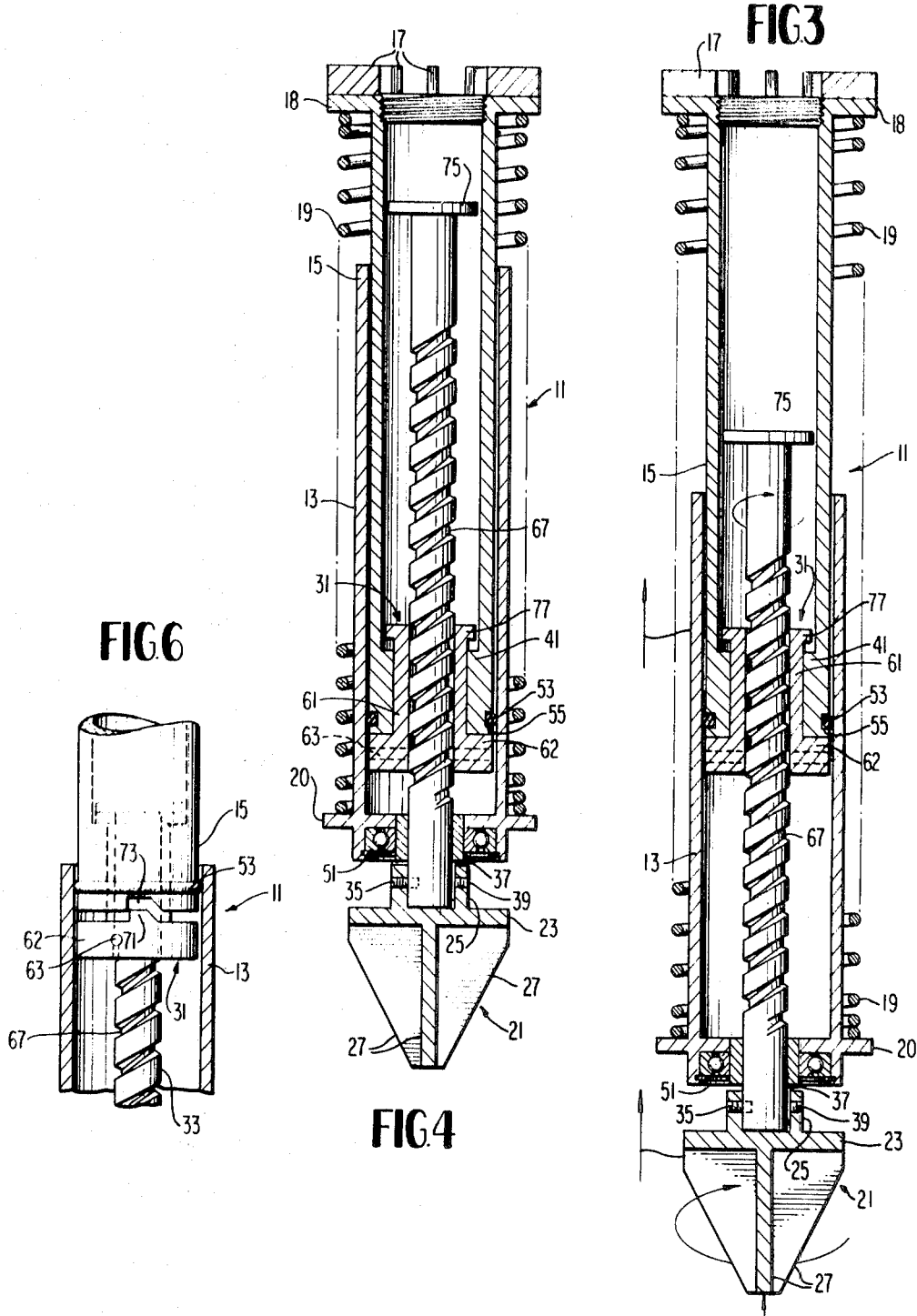

COUPLING AND UNCOUPLING DEVICE

In well drilling a variety of tools have been developed to extract threaded male fittings from threaded female members. These devices generally engage the internal wall of the male member and rotate it. However, the devices are not universally adaptable to fit members of different diameter, and usually require complicated mechanical linkages and bearings to facilitate rotation when the member is a drill pipe with a well casing.

In the terminology employed to describe well-drilling equipment, a rathole is generally a pipe of various sizes which is suspended from a platform on a drilling rig. The rathole is used to assemble and disassemble pipe. A device has long been needed for use within the rathole to uncouple a section of pipe or casing from another section or to remove a collar from a section or unscrew a fitting after the joint thereon has been loosened.

A universally adaptable device has also been needed which is readily convertible to function either to couple or uncouple pipe sections, whichever function is desired.

Accordingly, it is an object of this invention to provide a device for coupling or uncoupling pipe or other items of circular cross section adaptable to function within a casing or within a rathole.

It is another object to provide a coupling or uncoupling device adaptable to engage a wide variety of pipe sections having different diameters.

It is a further object to provide a device for translating vertical into rotational movement, whereby the downward force used to drive an uncoupling device into engagement with a pipe section is used to rotate the section either to couple or uncouple it.

It is yet another object to provide a one-way coupling or uncoupling device for use within a rathole which will engage and rotate a pipe section responsive to downward force, but will not rotate the section when the action is reversed to withdraw the device.

It is still another object to provide a coupling or uncoupling device for use within a pipe casing to rotate an internally disposed hollow, cylindrical body, said device having a wedged shaped engaging head threadedly received in a telescoping body so that as the body telescopes a thread follower therein drives the head in rotation and when the body extends, the threadedly received head is disengaged.

These and other objects will become readily apparent with reference to the drawings and following discussion wherein:

FIG. 1 is an elevation in partial section of the device of this invention disposed within a casing and rotating a pipe section;

FIG. 2 is a cross-sectional view of the device of this invention in an extended position;

FIG. 3 is a cross-sectional view of the device of this invention partially telescoped;

FIG. 4 is a cross section view of the device of this invention fully telescoped;

FIG. 5 is a cross-sectional view along line 5—5 of FIG. 2;

FIG. 6 is a cross section view along line 6—6 of FIG. 2; and

FIG. 7 is an end view of the device of this invention taken as indicated by line 7—7 of FIG. 2.

The following is a description of a preferred embodiment of the coupling and uncoupling device of this invention, which may be referred to as a spin-out tool, or a rathole spin-out tool when it is used to uncouple pipe, casing or collars in a rathole structure.

The device, as shown in FIGS. 1 through 4, broadly comprises three main groups. They are a biased, telescoping casing 11, a spinning head 21, and one-way driving group 31, disposed internally to the casing 11 and connecting the head 21 with said casing.

The head 21 comprises a horizontal base plate 23, an attachment neck 25 disposed coaxially on the upper surface of the plate 23, and a plurality of mutually spaced, tapered wedge members 27, depending from the plate 23. Four wedge members are shown in FIGS. 1 through 4, but it will be understood that any number may be used. They, however, must be coaxially disposed along plate 23 as radial members spaced at equal intervals about the axis of said plate 23.

The head 21 is designed to grip the internal surface of the terminal portion of a hollow body of circular cross section as for example in the case of the pipestem 29, shown in FIG. 1.

The casing group 11 includes a telescoping outer housing 13 and an inner support housing 15. Support 15 carries friction plate 17 for attachment to a vertical driver (not shown) to insure that the casing 11 does not rotate as it telescopes due to any torque which may be transmitted through the casing by rotation of the spinning head 21.

Outer housing 13 and inner housing 15 are connected by compression spring 19 which connects upper flange 18 on housing 15 and lower flange 20 on housing 13. Spring 19 normally urges the casing 11 into the extended position shown in FIG. 2.

Lower housing 13 carries a thrust bearing 51 disposed externally to flange 20 to prevent rotation of casing 13 as head 21 spins.

An O-ring seal 53 is provided in groove 55 of upper housing 15 to facilitate the sliding action between the outer surface of section 15 and inner surface of section 13.

The driving group 31 includes a threaded shaft 33, coaxially mounting head 21 at neck 25 through the use of locking screw 35, and key 37 and setscrew 39. Key 37 is received in a keyway 38 and a shaft 33 and neck 25, as shown in FIG. 2, and is held in place by setscrew 39. The locking screw 35 also connects neck 25 to shaft 33.

Upper casing 15 carrier an inwardly directed lip 41, lip 41 engages a one-way clutch 61. Clutch 61 also acts to transmit the vertical force of the driver (not shown) and the telescoping action of casing sections 13 and 15 to the threaded shaft 33.

The lower portion 62 of clutch 61 carries screw guide pins 63, which are secured thereto by set screws 65, as shown in FIG. 2. Guidepins 63 ride on screw thread 67 of shaft 33 rotating shaft 33 by a bearing force imparted to threads 67 as casing group 11 telescopes.

The lower portion 62 of clutch 61 has a lip 71, shown in FIG. 6. The lip provides for one-way rotation of the head 21 in that lip 71 fits in notch 73 of casing section 15, as the casing 11 telescopes. However, when the casing is extended from the position of FIG. 4 to that of FIG. 2, as urged by spring 19, lip 71 rides out of notch 73, as shown in FIG. 6 and clutch 61 then rotates with the extension of casing 11 while shaft 33 remains stationary and guidepins 63 follow thread 67.

As the casing 11 telescopes, clutch 61 is locked against rotation by the engaging action of lip 71 in notch 73 of upper casing section 15. Therefore, as pins 63 follow threads 67, the shafts 33 and head 21 are rotated.

Upon withdrawal of casing section 15 from casing section 13, lip 71 rides out of notch 73; thus, permitting rotation of clutch 61 about shaft 33, as pins 63 follow threads 67. The one-way action of clutch 61 thereby permits shaft 33 to remain stationary upon an extension of the casing 11.

Extension is stopped when neck 25 of head 21 reaches thrust bearing 51 of casing section 13 and stop collar 75 at the end of shaft 33 opposite the head 21 reaches the upper portion 77 of clutch 61. The upper portion 77 then engages the internal lip 41 of upper casing section 15.

As shown in FIG. 7, upper casing section 15 may carry, in addition to friction plate 17, a threadedly received grease plug 78. Removal of plug 78 provides access to the threaded shaft for disassembly.

The device of this invention is particularly suited for use in a rathole structure to uncouple drill stempipe having a previously loosened joint, although it will function equally well to separate collars or a wide variety of other hollow cylindrical bodies engaged in a threaded connection.

When used in this manner, shaft 33 must have left-handed threads 67 designed to rotate the head in a counterclockwise direction to unscrew the connection. If it is desired to couple a section of pipe, for example, to another section, it will be necessary to rotate the head in the opposite direction and therefore another threaded shaft having the necessary thread configuration will have to be substituted.

Disassembly is relatively simple. The head 21 is removed form shaft 33 by withdrawing locking screw 35, set screw 39 and key 37. Grease plug 78 is then removed and the shaft withdrawn through the end of the upper casing 15, which formally received the grease plug. Casing sections 13 and 15 may then be separated.

It will be obvious that various design modifications may be implemented without departing from the concept of this invention. The thread pattern on shaft 33 and the shape of notch 73 on casing and lip 71 on clutch portions 62 will be a matter of choice depending on the direction of head rotation desired.

Likewise, a variety of well-known thrust bearings and grease seals are applicable, and may be substituted for the O-ring and bearing shown in this embodiment.

Furthermore, although the device shown is mechanical, well-known hydraulic or pneumatic pistons may be used to impart the vertical force used to rotate the spinning head.

The action of spring 19 to extend the casing sections after the telescoping action used to drive the head may also be replaced by well-known pneumatic or hydraulic devices.

The invention herein disclosed depends primarily on the use of a threaded shaft and a thread follower to translate a downwardly directed force applied through the casing to the thread follower, which in turn drives the follower down the shaft, rotating the shaft, and spinning a head engaging the end of the shaft. A casing herein described telescopes responsive to the downwardly directed force, against the action of a compression spring. When the force is released, the energy stored in the spring drives the casing section into an extended position, disengaging the follower form the casing and allowing its return travel up the shaft to its normal position.

What is claimed and desired to be secured by United States Letters Patent is:

1. A device for imparting rotational motion to a hollow, cylindrical body comprising:
   means for engaging said body at an end thereof;
   a threaded shaft mounting said engaging means at an end thereof;
   follower means surrounding said shaft and engaging the threads of said shaft at an end opposite the end mounting said engaging means;
   drive means connected to said thread follower means for urging said follower means along said shaft towards said engaging means and for engaging said follower against rotational movement so that as said follower moves along said shaft responsive to said drive means, said shaft and said engaging means rotate;
   return means connecting said follower and said drive means for selectively disengaging said follower and said drive means, and for subsequently urging said follower along said shaft towards the end of said shaft, opposite said engaging means;
   said return means allowing rotation of said follower, relative to said shaft.

2. The engaging means of claim 1, comprising a baseplate and a plurality of tapered, wedge surfaces extending from a face of said plate and radially disposed about the normal central axis, said wedge surfaces designed to extend into the hollow cylindrical body engaging an inner surface thereof.

3. The return means of claim 1, comprising:
   bias means connecting said drive means and said follower means for normally urging said follower along said shaft toward the end of said shaft opposite the engaging means;
   clutch means connecting said drive means and said follower for engaging said follower against rotation when said follower is moving along said shaft towards said engaging means, and for selectively disengaging said follower from said drive means to allow said follower to rotate relative to said shaft when said follower is returning along said shaft in a direction away from said engaging means.

4. The device of claim 3 further comprising:
   a hollow, telescoping casing having an upper section and a lower section, said casing surrounding said threaded shaft, said lower section rotatably engaging said shaft at an end adjacent said engaging means and said upper section releasably engaging said thread follower means and said clutch means;
   means for telescoping said upper section into said lower section and for moving said follower means along said shaft so that as said shaft telescopes said shaft and said engaging means rotate.

5. A device for imparting rotational motion to a hollow cylindrical body, comprising:
   a threaded shaft;
   an upper casing member surrounding an end of said shaft and slidable engaging said shaft;
   a lower casing member surrounding said shaft and rotatably engaging said shaft adjacent an end thereof opposite said upper casing said lower casing disposed to slidably receive said upper casing;
   means attached at an end of said threaded shaft adjacent said lower casing for engaging said hollow cylindrical body;
   a thread follower surrounding said shaft and disposed within said lower casing adjacent said upper casing, said follower disposed to travel along said shaft;
   one-way clutch means releasable connecting said thread follower and said upper casing for connecting said follower and said upper casing as said upper casing slides along said shaft into said lower casing, and for releasing said follower and said upper casing when said casing slides along said shaft away from said lower casing;
   means fixedly attached to said upper casing for sliding said upper casing into said lower casing and for preventing rotation of said upper casing.

6. The device of claim 5 further comprising means connecting said upper and lower casing for normally urging said upper casing towards an end of said shaft opposite the end adjacent said lower casing.

7. The device of claim 6 wherein said means is a compression spring.

8. The device of claim 5 wherein the means for engaging the hollow cylindrical body comprises a faceplate attached at an end of said threaded shaft adjacent said lower casing and normal to said shaft, and a plurality of tapered wedges extending from the face of said plate and radially disposed on said plate about the axis of said shaft, said wedges disposed to engage a portion of the interior surface of said hollow cylindrical body.